United States Patent
Huang

(10) Patent No.: US 8,123,973 B2
(45) Date of Patent: Feb. 28, 2012

(54) METHOD OF MANUFACTURING MAGNETIC MATERIAL

(75) Inventor: Chih-Hao Huang, Tu-Cheng (TW)

(73) Assignee: Cheng Uei Precision Industry Co., Taipei Hsien (TW)

( * ) Notice: Subject to any disclaimer, the term of this patent is extended or adjusted under 35 U.S.C. 154(b) by 562 days.

(21) Appl. No.: 12/332,005

(22) Filed: Dec. 10, 2008

(65) Prior Publication Data
US 2010/0140535 A1      Jun. 10, 2010

(51) Int. Cl.
*H01F 1/10* (2006.01)

(52) U.S. Cl. ............... 252/62.56; 252/62.63; 252/62.62; 252/62.64; 423/594.1; 423/594.2

(58) Field of Classification Search ............... 252/62.56, 252/62.63, 62.62, 62.64; 423/594.1, 594.2
See application file for complete search history.

(56) References Cited

FOREIGN PATENT DOCUMENTS
CN            101269953      *  9/2008
* cited by examiner

*Primary Examiner* — Carol M Koslow
(74) *Attorney, Agent, or Firm* — Muncy, Geissler, Olds & Lowe, PLLC

(57) ABSTRACT

A method of manufacturing magnetic material is described hereinafter. Firstly, $Fe(NO_3)_3 \cdot 9H_2O$ and other metal nitrate compounds are dissolved in an alcohol solvent to form a mixed solution. Secondly, the mixed solution is heated to 60~100 degrees Centigrade. Next, citric acid is added into the mixed solution for being reacted with each other under the temperature of 60~100 degrees Centigrade so that can make the alcohol solvent volatilized and further obtain brown solid powder. Lastly, the solid powder is further heated for a period of time so as to obtain the magnetic material having a fluffy powdery form.

8 Claims, 1 Drawing Sheet

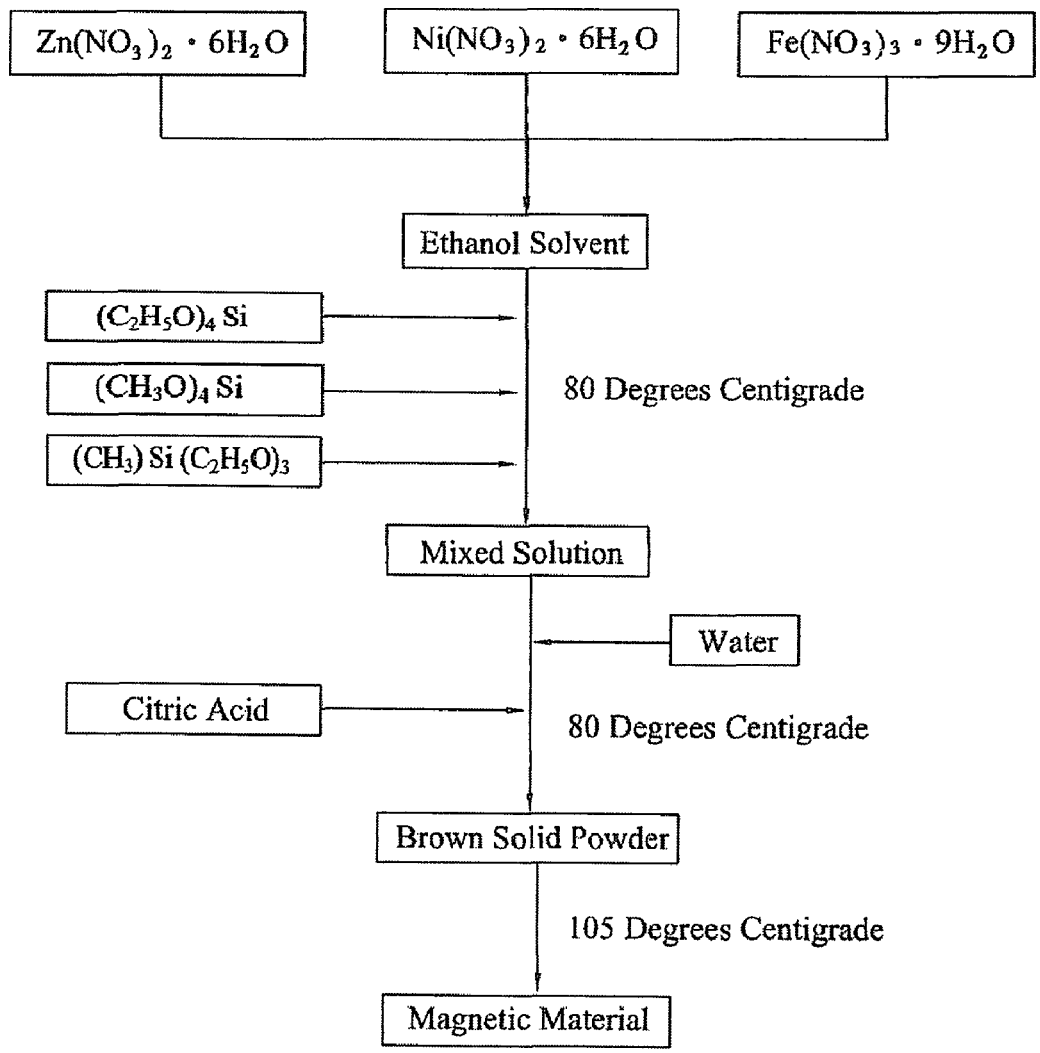

METHOD OF MANUFACTURING MAGNETIC MATERIAL

BACKGROUND OF THE INVENTION

1. Field of the Invention

The present invention generally relates to a method of manufacturing magnetic material, and more particularly to a method of manufacturing magnetic material in a liquid phase system.

2. The Related Art

At present, magnetic material can be manufactured in a solid phase system, a gaseous phase system and a liquid phase system respectively. The solid phase system has a simple manufacture process, but the reaction in the solid phase system must be achieved under the temperature of more than 600 degrees Centigrade, and moreover the magnetic material manufactured in the solid phase system is apt to cake. The gaseous phase system needs the temperature of more than 200 degrees Centigrade to manufacture the magnetic material, and moreover has a severe reacting condition and a small processing window such that is not adapted to manufacture the magnetic material on large scale. The magnetic material manufactured in the conventional liquid phase system will not have a higher purity unless being sintered under a high temperature of more than 400 degrees Centigrade.

SUMMARY OF THE INVENTION

An object of the present invention is to provide a method of manufacturing magnetic material which is described hereinafter. Firstly, $Fe(NO_3)_3.9H_2O$ and other metal nitrate compounds are dissolved in an alcohol solvent to form a mixed solution. Secondly, the mixed solution is heated to 60~100 degrees Centigrade. Next, citric acid is added into the mixed solution for being reacted with each other under the temperature of 60~100 degrees Centigrade so that can make the alcohol solvent volatilized and further obtain brown solid powder. Lastly, the solid powder is further heated for a period of time so as to obtain the magnetic material having a fluffy powdery form.

As described above, the foregoing method of the present invention can be achieved under a relatively lower temperature that effectively reduces the manufacture cost and facilitates the manufacture of the magnetic material. Moreover, the magnetic material manufactured by the above-mentioned method has a higher purity and is easy to be dispersed.

BRIEF DESCRIPTION OF THE DRAWINGS

The present invention will be apparent to those skilled in the art by reading the following description of a preferred embodiment thereof, with reference to the attached drawings, in which:

FIG. 1 is a block diagram of a method of manufacturing magnetic material according to an embodiment of the present invention.

DETAILED DESCRIPTION OF THE PREFERRED EMBODIMENT

A method of manufacturing magnetic material according to the present invention is described thereinafter. Firstly, $Fe(NO_3)_3.9H_2O$ and other metal nitrate compounds are dissolved in an alcohol solvent to form a mixed solution. Secondly, the mixed solution is slowly heated to 60~100 degrees Centigrade. Next, citric acid is added into the mixed solution for being reacted with each other under the temperature of 60~100 degrees Centigrade so that can make the alcohol solvent volatilized and further obtain brown solid powder. Lastly, the solid powder is further heated in an oven for a period of time under the temperature of 100~110 degrees Centigrade so as to obtain the magnetic material having a fluffy powdery form and a higher purity.

Before the mixed solution is heated, an organosilane compound of the formula $R_nSiX_{4-n}$ could be added into the mixed solution first, wherein R is an organic group, X is a hydrolyzable group, and n is an integer of from 0 to 2. In the embodiment, the organosilane compound can be any one of or a mixture of at least two selected from $(C_2H_5O)_4Si$, $(CH_3O)_4Si$, $(C_2H_5)Si(C_2H_5O)_3$ and $(CH_3)Si(C_2H_5O)_3$. The organosilane compound is added into the mixed solution for being reacted with each other so as to form a layer of silica protective film on the surface of the magnetic material so that can improve the stability of the magnetic material. Before the citric acid is added into the mixed solution, a proper quantity of water could be added into the mixed solution.

In the above-mentioned method, the other metal nitrate compounds can be any one of or a mixture of at least two selected from $Ni(NO_3)_2.6H_2O$, $Zn(NO_3)_2.6H_2O$, $Bi(NO_3)_3.5H_2O$, $Co(NO_3)_3.6H_2O$, $Mn(NO_3)_2.6H_2O$, $Mg(NO_3)_2.6H_2O$ and $Ba(NO_3)_2$. The alcohol solvent can be any one of or a mixture of an ethanol solvent and a propyl-alcohol solvent. The weight ratio of $Fe(NO_3)_3.9H_2O$ and the other metal nitrate compounds is 5:1~2 preferably. The weight ratio of a total weight of $Fe(NO_3)_3.9H_2O$ and the other metal nitrate compounds and the alcohol solvent is 1:1~1.5 preferably. The weight ratio of the total weight of $Fe(NO_3)_3.9H_2O$ and the other metal nitrate compounds and the citric acid is 10:0.5~2 preferably. The weight ratio of the total weight of $Fe(NO_3)_3.9H_2O$ and the other metal nitrate compounds and the organosilane compound is 10:0.5~2 preferably.

Referring to FIG. 1, an embodiment is introduced for describing the foregoing method in detail. Firstly, 250 g $Ni(NO_3)_2.6H_2O$, 256 g $Zn(NO_3)_2.6H_2O$ and 1389 g $Fe(NO_3)_3.9H_2O$ are put into 2500 ml ethanol solvent to be completely dissolved and form the mixed solution. Secondly, 100 g $(C_2H_5O)_4Si$, 50 g $(CH_3O)_4Si$ and 50 g $(CH_3)Si(C_2H_5O)_3$ are added into the mixed solution, and then the mixed solution is slowly heated to 80 degrees Centigrade. Next, 50 g water and 200 g citric acid are successively added into the heated mixed solution so as to be reacted with each other, such that can make the alcohol solvent volatilized due to a great quantity of heat energy generated from the reaction process and further obtain the brown solid powder. Lastly, the solid powder is further heated in the oven for 12 hours under the temperature of 105 degrees Centigrade so as to obtain the magnetic material having a fluffy powdery form, a higher purity and a layer of silica protective film thereon.

As described above, the method of manufacturing the magnetic material according to the present invention can be achieved under a relatively lower temperature that effectively reduces the manufacture cost and facilitates the manufacture of the magnetic material. Moreover, the magnetic material manufactured by the above-mentioned method has a higher purity and is easy to be dispersed.

What is claimed is:

1. A method of manufacturing magnetic material, comprising the steps of:
    dissolving $Fe(NO_3)_3.9H_2O$ and other metal nitrate compounds in an alcohol solvent to form a mixed solution;
    heating the mixed solution to 60~100 degrees Centigrade;
    adding citric acid into the mixed solution for being reacted with each other under the temperature of 60~100 degrees Centigrade so that can make the alcohol solvent volatilized and further obtain brown solid powder; and heating the solid powder further for a period of time so as to obtain the magnetic material having a fluffy powdery form.

2. The method as claimed in claim 1, wherein the other metal nitrate compounds can be any one of or a mixture of at least two selected from $Ni(NO_3)_2 \cdot 6H_2O$, $Zn(NO_3)_2 \cdot 6H_2O$, $Bi(NO_3)_3 \cdot 5H_2O$, $Co(NO_3)_3 \cdot 6H_2O$, $Mn(NO_3)_2 \cdot 6H_2O$, $Mg(NO_3)_2 \cdot 6H_2O$ and $Ba(NO_3)_2$.

3. The method as claimed in claim 1, wherein the weight ratio of $Fe(NO_3)_3 \cdot 9H_2O$ and the other metal nitrate compounds is 5:1~2, the weight ratio of a total weight of $Fe(NO_3)_3 \cdot 9H_2O$ and the other metal nitrate compounds and the alcohol solvent is 1:1~1.5, the weight ratio of the total weight of $Fe(NO_3)_3 \cdot 9H_2O$ and the other metal nitrate compounds and the citric acid is 10:0.5~2.

4. The method as claimed in claim 1, wherein an organosilane compound of the formula $R_nSiX_{4-n}$ is added into the mixed solution first before the mixed solution is heated, wherein R is an organic group, X is a hydrolyzable group, and n is an integer of from 0 to 2.

5. The method as claimed in claim 4, wherein the organosilane compound can be any one of or a mixture of at least two selected from $(C_2H_5O)_4Si$, $(CH_3O)_4Si$, $(C_2H_5)Si(C_2H_5O)_3$ and $(CH_3)Si(C_2H_5O)_3$.

6. The method as claimed in claim 4, wherein the weight ratio of a total weight of $Fe(NO_3)_3 \cdot 9H_2O$ and the other metal nitrate compounds and the organosilane compound is 10:0.5~2.

7. The method as claimed in claim 1, wherein the solid powder is further heated to 100~110 degrees Centigrade.

8. The method as claimed in claim 1, wherein the alcohol solvent can be any one of or a mixture of an ethanol solvent and a propyl-alcohol solvent.

* * * * *

UNITED STATES PATENT AND TRADEMARK OFFICE
CERTIFICATE OF CORRECTION

PATENT NO. : 8,123,973 B2
APPLICATION NO. : 12/332005
DATED : February 28, 2012
INVENTOR(S) : Chih-Hao Huang It is certified that error appears in the above-identified patent and that said Letters Patent is hereby corrected as shown below:

Title Page, Item (73)

The name of the assignee is --CHENG UEI PRECISION INDUSTRY CO., LTD.--

Signed and Sealed this
Second Day of October, 2012

David J. Kappos
*Director of the United States Patent and Trademark Office*